US008325357B2

(12) United States Patent
Hasebe

(10) Patent No.: US 8,325,357 B2
(45) Date of Patent: Dec. 4, 2012

(54) OPTICAL WRITING DEVICE, IMAGE FORMING APPARATUS AND LIGHT QUANTITY CORRECTING METHOD

(75) Inventor: Takashi Hasebe, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1205 days.

(21) Appl. No.: 12/140,556

(22) Filed: Jun. 17, 2008

(65) Prior Publication Data

US 2009/0009798 A1 Jan. 8, 2009

(30) Foreign Application Priority Data

Jul. 5, 2007 (JP) ................................ 2007-177348

(51) Int. Cl.
*G06F 15/00* (2006.01)
*G06K 1/00* (2006.01)

(52) U.S. Cl. ........................ 358/1.15; 358/1.1; 358/1.16

(58) Field of Classification Search ........................ None
See application file for complete search history.

(56) References Cited

U.S. PATENT DOCUMENTS

2001/0017715 A1 8/2001 Nagumo
2006/0192843 A1 8/2006 Ohba
2007/0030327 A1 2/2007 Chino
2008/0158330 A1 7/2008 Hasebe

FOREIGN PATENT DOCUMENTS

JP 2001-239697 9/2001
JP 2004-53761 2/2004
JP 2005-141044 6/2005
JP 2008165022 7/2008
WO WO 2008/038896 4/2008

OTHER PUBLICATIONS

European Search Report dated Sep. 3, 2008.

*Primary Examiner* — Thierry Pham
(74) *Attorney, Agent, or Firm* — Finnegan, Henderson, Farabow, Garrett & Dunner, L.L.P.

(57) ABSTRACT

Disclosed is an optical writing device comprising: a plurality of light emitting diode elements which are arranged in a main scanning direction; and a plurality of radio frequency identification tags which are provided correspondingly to one or more light emitting diode elements among the plurality of light emitting diode elements, each of the plurality of radio frequency identification tags having a light quantity correcting data storage section to store light quantity correcting data for adjusting a light quantity of the one or more light emitting diode elements, and a communication section to perform a wireless communication.

10 Claims, 4 Drawing Sheets

OPTICAL WRITING DEVICE, IMAGE FORMING APPARATUS AND LIGHT QUANTITY CORRECTING METHOD

BACKGROUND OF THE INVENTION

1. Field of the Invention

The present invention relates to an optical writing device, an image forming apparatus and a light quantity correcting method.

2. Description of Related Art

In recent years, as an optical writing device to form an electrostatic latent image on the surface of a photosensitive body, an image forming apparatus using a light emitting diode (LED) printer head (hereinafter referred to as LPH) has been developed. The LPH is composed of LED chips arranged in an array, an optical section, such as a graded-index (GRIN) lens, and the like. Each of the LED chips includes a plurality of LED elements arranged according to previously set resolution along a main scanning direction. The optical section condenses irradiated light emitted from the LED elements according to image data to form an electrostatic latent image on the photosensitive body.

It is known that the LPH described above produces light quantity unevenness in association with the manufacturing dispersion of the LED elements, the optical characteristics of the GRIN lens, and the like. In order to settle the light quantity unevenness, a technique of performing optical writing is known. The technique digitally controls the current values of the driver circuits which illuminate the LED elements to previously store the light quantity correcting data so as to make the light quantities of the plurality of LED elements to be uniform, into an electrically erasable and writable nonvolatile memory, such as an electronically erasable and programmable read only memory (EPROM). Then, the technique reads the light quantity correcting data stored in the memory to a control apparatus, which collectively controls the image forming apparatus, and performs the optical writing by using the image data and the read light quantity correcting data.

Moreover, the heightening of the resolution in the main scanning direction (the arrangement direction of the LED chips), such as 600 dpi or 1200 dpi, has been advancing in association with the realization of the densification of the arrangement of the LED elements. For example, when the maximum paper size capable of image formation in an image forming apparatus is 324 mm (width direction) of the A3 wide size, then 7680 LED elements are arranged in the case of the resolution of 600 dpi, and 15360 LED elements are arranged in the case of the resolution of 1200 dpi.

In association with the increase of the number of LED elements accompanying the heightening of the resolution in this manner, the quantity of the data to be controlled as image data increases, and the optical writing control method also comes to control an exposure time of lighting on the basis of the set numerical values of a plurality of bits as well as the simple on-off operations of the LED elements. The traffic of data to be used for performing optical writing has also increased. Consequently, it has become indispensable to install an LPH interface having a large capacity and equipped with a high-speed data transmission function in association with the demand of the improvement of the productivity (high-speed performance) of the image forming apparatus.

Furthermore, when images are formed on various kinds of paper, for example, an electrophotographic printing system image forming apparatus must meet data communication functions dealing with the image formation speeds according to various types of paper by being equipped with the plurality of image formation speeds according to various paper features (such as paper types and thicknesses) even in the same image forming apparatus in order to improve the fixation property of toner.

To settle the problem mentioned above, there is a technique to attain a high-speed conversion of multi-bit data as a technique of an interface having a large capacity and realizing a high-speed data transmission function. The technique, for example, performs the parallel-serial conversion of clock synchronous parallel data with a low voltage differential signaling (LVDS) circuit and performs the clock modulation of the converted data according to the number of serial conversion bits with a phase locked loop (PLL) circuit on a transmission side, and the technique restores the modulated serial data to the input parallel data by the serial-parallel conversion thereof with a receiver circuit equipped with a frequency modulation circuit and by restoring the modulated clocks to the document ones on a reception side. The technique thereby attains the high-speed conversion of the multi-bit data.

The large capacity and high-speed data transmission function can be realized by arranging a control signal, image data, and light quantity correcting data in parallel data by means of the aforesaid technique, and the degree of freedom of a bundled wire length is enhanced to enable the degree of freedom of the layout of the inside of an image forming apparatus. Thus high-speed data processing sections can be arranged in a concentrated manner to be a unit.

However, the method of settlement mentioned above can perform high-speed communications of exposure data and the like to an LPH, but, when the method is tried to utilize for a reading section of the light quantity correcting data of the LPH, then the cost of the circuit parts thereof rises, and the production cost rises in association with the rise of the cost of the circuit parts. Consequently, the rise of the production cost causes a disadvantage for a user. Moreover, there is a limitation of a bundled wire length owing to the limitation of the circuit configuration to read the light quantity correcting data, and the method has the problem of the impossibility of making the best use of the performance of the LVDS circuit for exposure data.

There is also the method of installing a memory (such as a ROM) storing the light quantity correcting data in an image forming apparatus as a means of settling this problem, but, because the image forming apparatus, which is required to be a high speed and to have high durability, needs to exchange the LPH and adjust the light quantity correcting data according to the process conditions and the frequency of use thereof at the time of the maintenance thereof, it is necessary to perform the updating of the data of the memory or the exchange of the memory for every operation of the exchange and the adjustment. Consequently, when the memory does not store the light quantity correcting data fitted to the LPH owing to a minor operation mistake, then the fact becomes a cause of producing a bad image. Furthermore, the management of the light quantity correcting data becomes necessary also in the production process of the image forming apparatus, and it becomes necessary to collate the LPH installed in the image forming apparatus with the light quantity correcting data stored in the memory to cause a new technical problem.

Accordingly, a technique of providing a nonvolatile memory storing light quantity correcting data in the LPH to read the light quantity correcting data from the memory is generally performed.

For example, Japanese Patent Application Laid-Open Publication No. 2001-239697 discloses an apparatus which performs the light control of LED elements by reading light quantity correcting data from an EEPROM (a memory storing the light quantity correcting data) through a strobe signal, by supplying the read light quantity correcting data to an LED driver IC as print data, and by supplying a drive instruction of a LED array according to the print data by the strobe signal as the selection signal of an LED array group.

The technique disclosed in Japanese Patent Application Laid-Open Publication No. 2001-239697 describes that a drive section (printing control section) generates a clock signal to obtain the light quantity correcting data, and inputs the light quantity correcting data stored in the memory into the drive section in synchronization with the generated clock signal, and further transfers the light quantity correcting data by the supplied clock signal. The technique aims at obtaining the effect of reducing the design margin accompanying a timing change between the transfer clock of the printing data and the transfer clock of the light quantity correcting data. That is, the technique individually considers the reading control of the light quantity correcting data, the setting control of the light quantity correcting data, and the transmission method of printing data, and provides an interface circuit balancing so that each of them can be processed by a proper method.

Moreover, the similar technique to a detachably attachable part unit as well as the LPH exists, and, for example, Japanese Patent Application Laid-Open Publication No. 2004-053761 discloses an image forming apparatus to read the information stored in a memory device of a part unit, which is exchangeably installed in an image forming apparatus, before the installation of the memory into the image forming apparatus with a reading section provided in the image forming apparatus.

Furthermore, Japanese Patent Application Laid-Open Publication No. 2005-141044 discloses a printing apparatus to read exchange notice information from an RFID tag in noncontact with it with a single antenna. The RFID tag is disposed in the image formation unit of each color to be printed, and stores the exchange notice information to notify an exchange instruction of each image formation unit beforehand.

However, because the related art mentioned above is required to balance the interfaces of the whole image forming apparatus in order to improve the throughput of large capacity light quantity correcting data and the communication performances (high-speed performance and reliability of transmission signal) of data, the printing performance thereof is sacrificed. Consequently, the communication performance is limited by the reading of light quantity correcting data from the memory and a set function. Moreover, in the case of the technique of Japanese Patent Application Laid-Open Publication No. 2001-239697, also in the case where the bundled wire length is desired to be elongated, the bundled wire length is limited by the interface circuit.

Furthermore, because the related art mentioned above provides a memory to each part, that is, to each LPH, it is difficult to read or write light quantity correcting data against an arbitrary LED element, and must perform the reading or writing of light quantity correcting data to all of the LED elements provided in the LPH. Consequently, when image formation is performed to a sheet of paper having a smaller width than an effective light writing width, then it is sufficient to read the light quantity correcting data of the LED elements to the width of the paper. But, the light quantity correcting data of all the LED elements is read. Consequently, the related art has the problem of the generation of a useless communication load.

SUMMARY OF THE INVENTION

An object of the present invention is, in view of the problems mentioned above, to attain the speeding up and stabilizing of the communication of light quantity correcting data, attaining the facilitation of the reading or writing operation of the light quantity correcting data.

According to an aspect of the present invention, there is provided an optical writing device comprising:

a plurality of light emitting diode elements which are arranged in a main scanning direction; and a plurality of radio frequency identification tags which are provided correspondingly to one or more light emitting diode elements among the plurality of light emitting diode elements, each of the plurality of radio frequency identification tags having a light quantity correcting data storage section to store light quantity correcting data for adjusting a light quantity of the one or more light emitting diode elements, and a communication section to perform a wireless communication.

According to another aspect of the present invention, there is provided an image forming apparatus comprising:

an optical writing device having:

- a plurality of light emitting diode elements which are arranged in a main scanning direction; and
- a plurality of radio frequency identification tags which are provided correspondingly to one or more light emitting diode elements among the plurality of light emitting diode elements, each of the plurality of radio frequency identification tags having a light quantity correcting data storage section to store light quantity correcting data for adjusting a light quantity of the one or more light emitting diode elements, and a communication section to a perform wireless communication;

a radio frequency identification transmitting and receiving section to perform the wireless communication with the radio frequency identification tags;

a control section to make the radio frequency identification transmitting and receiving section perform the wireless communication with the radio frequency identification tags so as to read or write the light quantity correcting data from each of the light quantity correcting data storage sections in each of the radio frequency identification tags; and a storage section to store the light quantity correcting data which is read from each of the light quantity correcting data storage sections in each of the radio frequency identification tags by the control section.

According to still another aspect of the present invention, there is provided an optical writing light quantity correcting method used in an image forming apparatus which forms an image by an optical writing device having a plurality of light emitting diode elements arranged in a main scanning direction, comprising:

dividing an arrangement of the light emitting diode elements into groups including two or more light emitting diode elements, and storing light quantity correcting data in advance to adjust a light quantity of the two or more light emitting diode elements included in each of the groups, in a plurality of radio frequency identification tags which are provided correspondingly to each of the groups;

reading the light quantity correcting data of the two or more light emitting diode elements included in each of the groups by performing a wireless communication with the plurality of radio frequency identification tags;

storing the read light quantity correcting data in a storage section; and adjusting the light quantity of the two or more light emitting diode elements included in each of the groups based on the stored light quantity correcting data.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, wherein.

DETAILED DESCRIPTION OF THE PREFERRED EMBODIMENT

In the following, an embodiment of the present invention will be described in detail with reference to the attached drawings.

The configuration thereof is first described.

Figure 1:
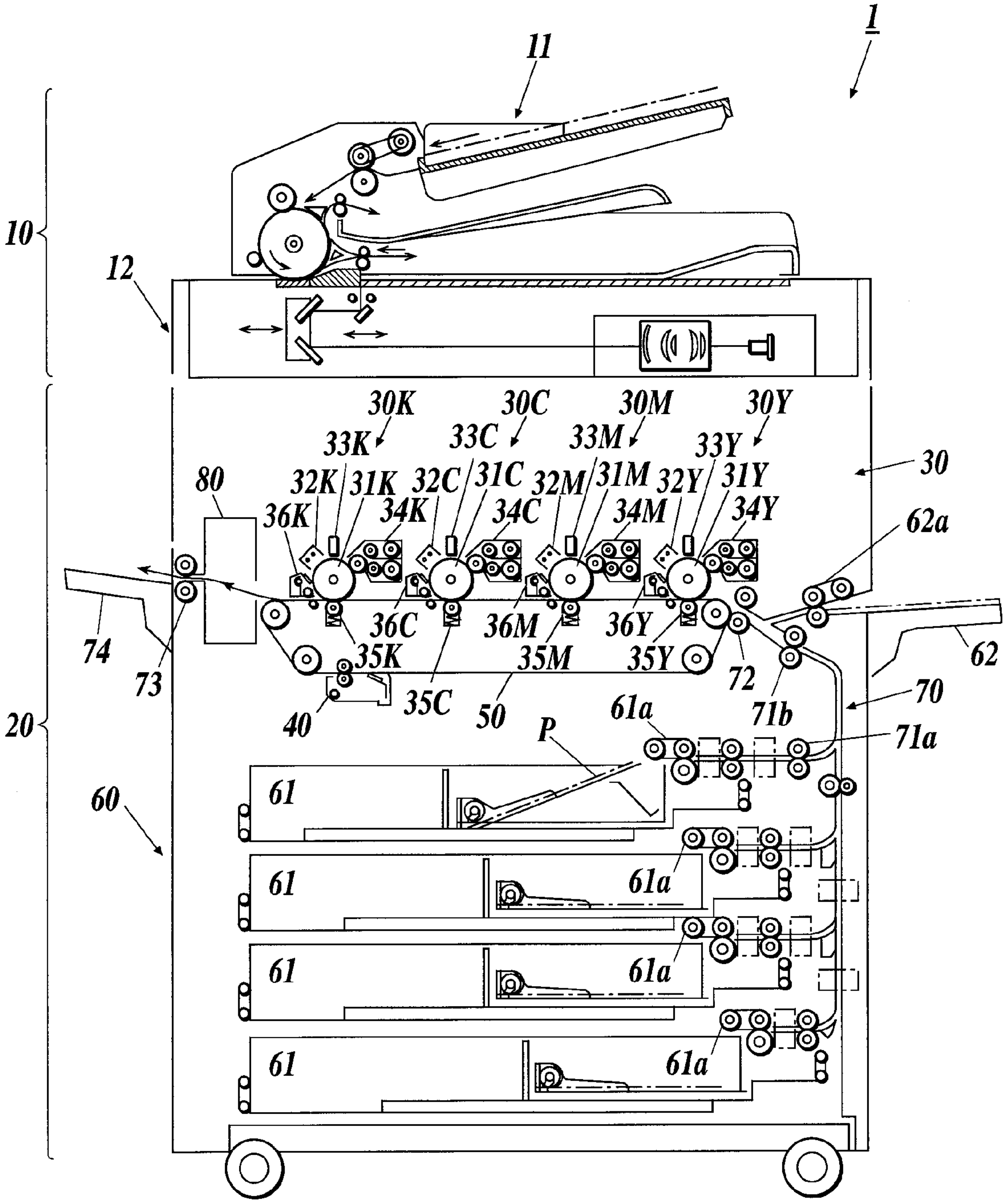
FIG. 1 is a schematic sectional configuration view of an image forming apparatus of an embodiment.

FIG. 1 shows a schematic sectional configuration view of an image forming apparatus 1 of the present embodiment.

The image forming apparatus 1 is a digital multifunction peripheral equipped with a copy function, a printer function, and the like. The copy function is the one to read an image of a document, and to perform the image formation of the read image on a sheet of paper P or the like. The printer function is the one to receive image data from an external apparatus, such as a personal computer (PC), and to form the image expressed by the image data on the paper P to output the paper P. As shown in FIG. 1, the image forming apparatus 1 is composed of an image reading section 10 and a printing section 20.

The image reading section 10 is equipped with an automatic document feeding section 11 called as an auto document feeder (ADF) and a reading section 12.

The automatic document feeding section 11 conveys the documents loaded on a document tray from the uppermost one in order, and makes the document pass a contact glass at the reading position of the document with the document stuck fast to the contact glass. Then, the automatic document feeding section 11 ejects the document which has passed the contact glass and the reading of which has been completed to an ejection tray.

The reading section 12 is composed of a scanner including a light source, a lens, the contact glass, a charge coupled device (CCD) image sensor, and the like. The reading section 12 reads the document image (analog image signal) of a document by forming an image by means of the reflected lights of the lights radiated to the document and by performing the photoelectric conversion of the formed image. The reading section 12 performs the A/D conversion and the various kinds of image processing of the read document image. After that, the reading section 12 outputs the processed document image to the printing section 20 as print data. The image is not limited to image data such as a figure and a picture, but means to include text data such as a character and a sign here.

The printing section 20 performs the image formation of an electrophotographic printing system on the basis of input print data. The printing section 20 is composed of an image forming section 30, a cleaning section 40, a transfer belt 50, a paper feeding section 60, a conveyance section 70, and a fixing section 80.

The image forming section 30 of the present embodiment is composed of image forming sections 30Y, 30M, 30C, and 30K of each color, which can respectively be filled up with toners having different colors at the time of forming an image including four colors (yellow (Y), magenta (M), cyan (C), and black (K)) at the maximum.

For example, the image forming section 30Y is equipped with a photosensitive body drum 31Y, a charging device 32Y, an LED printer head (hereinafter referred to as an LPH) 33Y as an optical writing device, a development device 34Y, a transfer device 35Y, and a cleaning device 36Y. The image forming section 30Y forms a yellow (Y) image.

The LPH 33Y is equipped with a plurality of light emitting diodes (LED) arranged in the main scanning direction as light sources for optical writing, an optical member including a plurality of graded-index (GRIN) lenses arranged in the main scanning direction, an LED drive/light quantity correcting circuit, and a plurality of RFID tags, which will be described later. The LPH 33Y selectively drives the LED elements on the basis of image data, and condenses the light radiated from the driven LED elements onto the photosensitive body drum 31Y to form an image.

It is known that some differences are produced among the light quantities of the respective LED elements even when they are driven under the same conditions owing to the dispersion of the mechanical characteristics and the electric characteristics of the LED elements at the time of manufacturing, the dispersion of the electric current resistances of drive circuits, the electric dispersion of mounting members (such as LED installing substrates), and the like.

Accordingly, the LED drive/light quantity correcting circuit is provided with a correction section to correct the current quantity, the rise drive characteristic, and the light quantity of each LED element, for every LED element so that the dispersion of the light quantities of the whole LPH 33Y may fall into a certain range. The light quantity correcting and driving operations of each LED element are performed on the basis of the light quantity correcting data obtained from a plurality of RFID tags, which is provided in the LPH 33Y and will be described later, and input image data.

To put it concretely, the LPH 33Y radiates a light according to the image data of yellow (Y) to the photosensitive body drum 31Y charged by the charging device 32Y to form a latent image. Then, the development device 34Y adheres the charged yellow toner onto the surface of the photosensitive body drum 31Y, on which the latent image is formed, to develop the latent image. The photosensitive body drum 31Y, on which the toner is adhered by the development device 34Y, rotates a constant speed to move the adhered toner image to the transfer position, where the transfer device 35Y is disposed, and the toner image is transferred to the transfer belt 50, which will be described later. After the transfer of the toner image to the transfer belt 50, the cleaning device 36Y removes the remaining charges and remaining toner on the surface of the photosensitive body drum 31Y.

The image forming sections 30M, 30C, and 30K are composed of the similar configurations to that of the image forming section 30Y, and are equipped with charging devices 32M, 32C, and 32K, LPHs 33M, 33C, and 33K, development devices 34M, 34C, and 34K, transfer devices 35M, 35C, and 35K, and cleaning devices 36M, 36C, and 36K, which are arranged around photosensitive body drums 31M, 31C, and 31K, respectively. The image forming sections 30M, 30C, and 30K form toner images of magenta (M), cyan (C), and black (K), respectively.

The transfer belt 50 is a semi-conductive endless belt extended by a plurality of rollers and rotatably supported by them, and is driven to rotate by the rotations of the rollers.

The transfer belt 50 is pressed to the photosensitive body drums 31Y, 31M, 31C, and 31K by the transfer devices 35Y, 35M, 35C, and 35K, respectively. Each toner developed on the surfaces of the photosensitive body drums 31Y, 31M, 31C, and 31K is transferred onto the paper P conveyed on the transfer belt 50 at the transfer positions of the transfer devices 35Y, 35M, 35C, and 35K, respectively, in the order of yellow, magenta, cyan, and black, respectively, in the overlapped state on the paper P.

The paper feeding section 60 is equipped with a plurality of paper feed trays 61 and a manual paper feed tray 62.

The paper feed trays 61 houses paper P previously discriminated by the size thereof and the type thereof into each of the paper feed trays 61, and the paper feed trays 61 convey the housed paper P one by one from that placed at the upper most positions with paper feed rollers 61*a* to the conveyance section 70.

The manual paper feed tray 62 is made to be able to load the various types of paper P according to the need of a user, and conveys the loaded paper P one by one from the upper most position with paper feed rollers 62*a* to the conveyance section 70.

The conveyance section 70 conveys the paper P conveyed from the paper feed trays 61 or the manual paper feed tray 62 to the transfer device 35Y and the like through a plurality of intermediate rollers 71*a* and 71*b*, and a resist roller 72.

The fixing section 80 performs the heat fixing of a toner image transferred on the paper P conveyed by the conveyance section 70. The paper P subjected to the fixing processing is ejected onto an ejection tray 74, put between paper ejecting rollers 73.

The remaining toner and the like of the transfer belt 50, from which the paper P is separated by the difference of their curvatures and electrostatically after the transfer of the toner image by the transfer devices 35Y, 35M, 35C, and 35K, are removed by the cleaning section 40.

Figure 2:
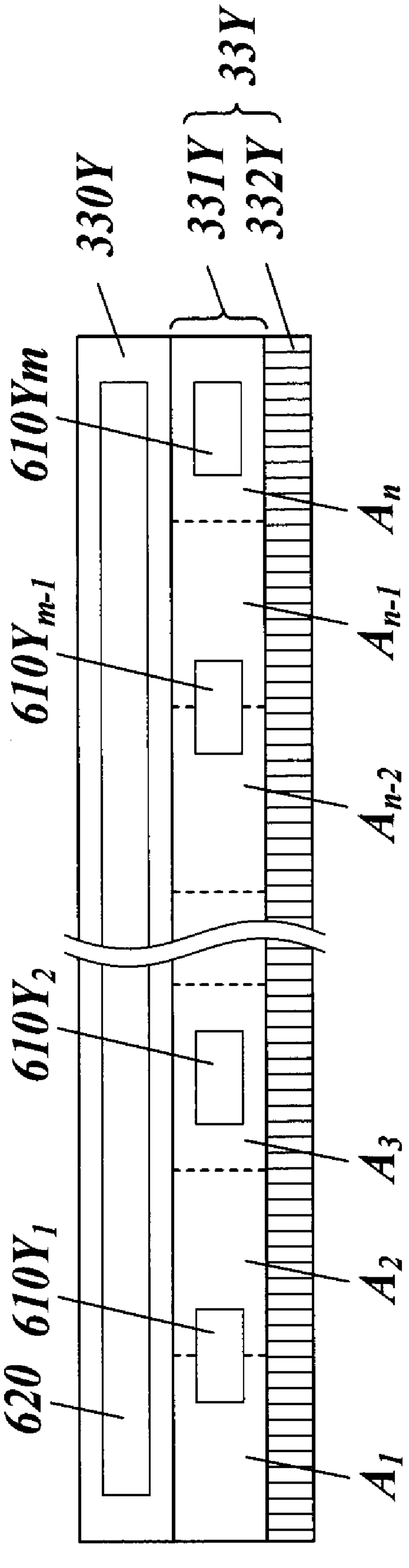
FIG. 2 is a view showing an example of the side view of an LPH.

FIG. 2 shows an example of the side view of the LPH 33Y.

As shown in FIG. 2, the LPH 33Y is provided to the image forming apparatus 1 with an LPH fixing member 330Y in the state capable of being attached and detached, and is composed of an LPH main body section 331Y, a GRIN lens section 332Y, and a plurality of RFID tags $610Y_1$-$610Y_m$. The LPH main body section 331Y includes a plurality of LED elements, the LED drive/light quantity correcting circuit, and the like. The RFID tags $610Y_1$-$610Y_m$ are stuck on the side surface of the LPH main body section 331Y.

The LPH fixing member 330Y is provided with an RFID transmitting and receiving section 620Y as an RFID transmitting and receiving section to perform wireless communication with the plurality of RFID tags $610Y_1$-$610Y_m$ stuck on the LPH 33Y.

The plurality of LED elements arranged in the main scanning direction of the LPH main body section 331Y is divided into a plurality of groups along the main scanning direction X for every one or a plurality of LED elements. In FIG. 2, the region of each group is indicated by letters $A_1$-$A_n$.

The RFID tags $610Y_1$-$610Y_m$ are provided to be assigned to correspond to one or an adjoining plurality of groups. For example, in FIG. 2, two groups $A_1$ and $A_2$ are assigned to the RFID tag $610Y_1$, and a group $A_3$ is assigned to the RFID tag $610Y_2$.

Each group may be configured by dividing the plurality of LED elements for every previously set number of LED elements, that is, for every LED chip including a plurality of light emitting diode (LED) elements, along the main scanning direction X.

When the RFID tag is provided for every group divided for every previously set number of LED elements, for example, for every LED chip, then light quantity correcting data can thereby be managed for every LED chip.

Incidentally, when the number of the LED chips increases accompanying the heightening of resolution, also the number of RFID tags increases. Accordingly, the times of the accessing of the RFID transmitting and receiving section 620Y to the RFID tags should be considered, and it is thus realistic to assign a plurality of LED chips to one RFID tag.

Moreover, each group may be configured by dividing the plurality of LED elements on the basis of the main scanning width of a plurality of sheets of paper on which images can be formed by optical writing in the image forming apparatus 1. In this case, the light quantity correcting data can be managed for every group divided on the basis of the main scanning widths of the sheets of paper.

Incidentally, because the side views of the LPHs 33M, 33C, and 33K are similar to that of the LPH 33Y shown in FIG. 2, the illustration and the description of the LPHs 33M, 33C, and 33K are omitted.

Figure 3:
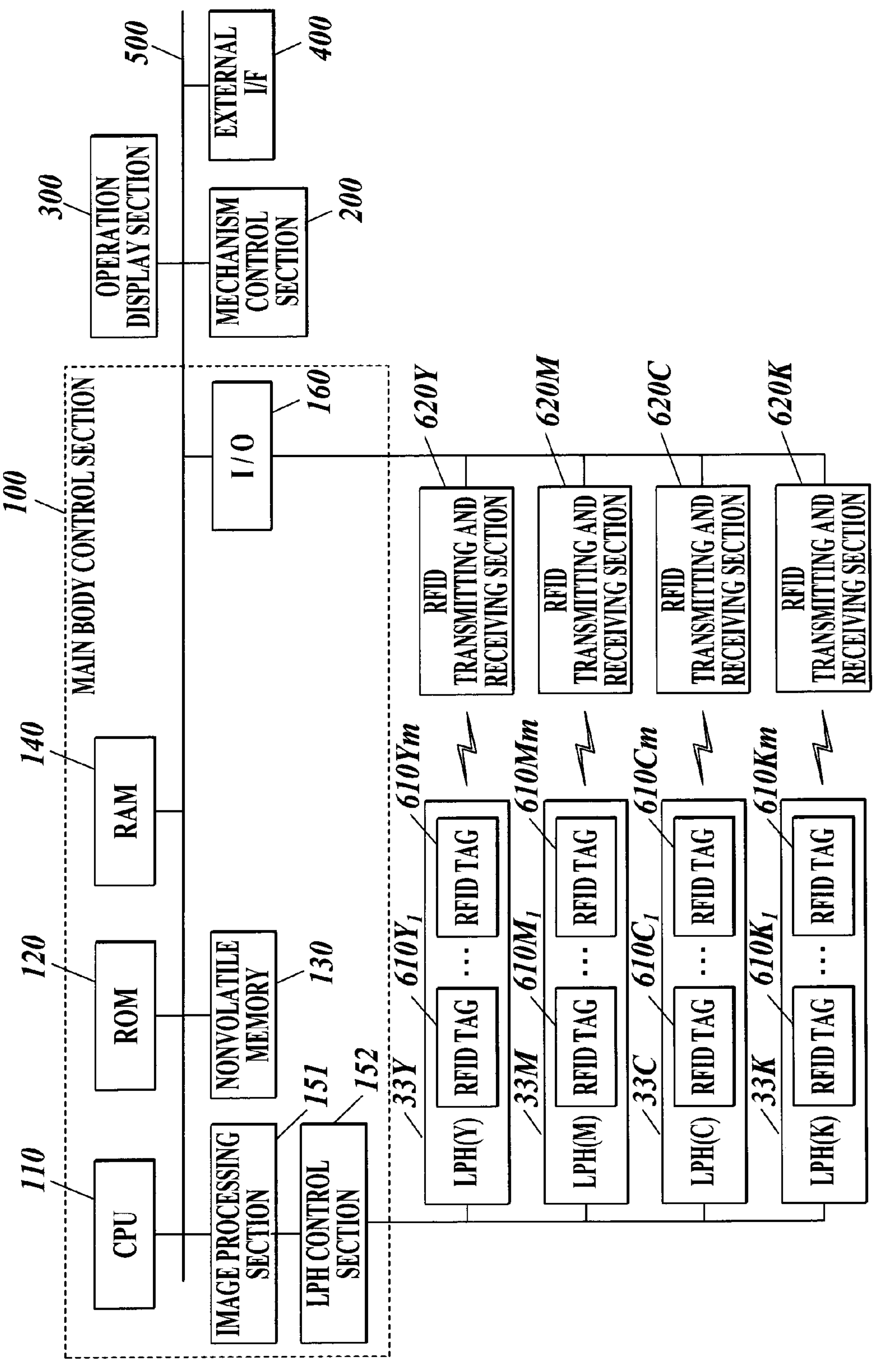
FIG. 3 is a control block diagram of the image forming apparatus of the embodiment.

FIG. 3 shows the control block diagram of the image forming apparatus 1 of the present embodiment.

As shown in FIG. 3, the image forming apparatus 1 is composed of a main body control section 100, a mechanism control section 200, an operation display section 300, an external I/F 400, a plurality of radio frequency ID (RFID) tags $610Y_1$-$610Y_m$, $610M_1$-$610M_m$, $610C_1$-$610C_m$, and $610K_1$-$610K_m$ provided to the LPHs 33Y, 33M, 33C, and 33K, respectively, the RFID transmitting and receiving sections 620Y, 620M, 620C, and 620K, the image reading section 10, the printing section 20, and the like. Each section is connected with one another through a bus 500.

The main body control section 100 is equipped with a central processing unit (CPU) 110, a read only memory (ROM) 120, a nonvolatile memory 130, a random access memory (RAM) 140, an image processing section 151, an LPH control section 152 connected to the image processing section 151, an input/output (I/O) 160, and the like.

The CPU 110 reads a system program, each processing program, and data, which are stored in the ROM 120 or the nonvolatile memory 130, and expands the read programs and data into the nonvolatile memory 130 or the RAM 140. The CPU 110 then controls the operation of each section of the image forming apparatus 1 in accordance with the expanded programs in a concentrated manner. The CPU 110 performs the timing control of the whole system, the storage and accumulation control of image data by the use of the nonvolatile memory 130 or the RAM 140, the input and output control of the image data against the printing section 20, and the interface (I/F) and operation control of the other applications (fax, printer, scanner, and the like).

Moreover, the CPU 110 temporarily stores the image data, which has been transmitted from the external apparatus, such as a personal computer (PC), and received through the external I/F 400, and the image data transmitted from the image reading section 10 into the nonvolatile memory 130 or the RAM 140, and expands the print data based on the image data into the image processing section 151. The CPU 110 outputs a start instructing signal to the mechanism control section 200 to make each section of the image forming apparatus 1 operate.

The ROM 120 previously stores programs and data dealing with the image forming apparatus 1, and stores a system program, the various processing programs capable of dealing with the system, the data necessary for the processing of the various processing programs.

Moreover, the ROM 120 previously stores the program to make the CPU 110 execute light quantity correcting data reading processing or light quantity correcting data writing processing, and various data necessary for the execution of the program in the present embodiment. The light quantity correcting data reading processing or the light quantity correcting data writing processing makes each of the RFID transmitting and receiving sections 620Y, 620M, 620C, and 620K perform wireless communication with the plurality of RFID tags 610Y1-610Ym, 610$M_1$-610$M_m$, 610$C_1$-610$C_m$, and 610$K_1$-610$K_m$ provided in the LPHs 33Y, 33M, 33C, and 33K corresponding to the RFID transmitting and receiving sections 620Y, 620M, 620C, and 620K, respectively, to read or write the light quantity correcting data stored in each of the RFID tags 610Y1-610Ym, 610$M_1$-610$M_m$, 610$C_1$-610$C_m$, and 610$K_1$-610$K_m$.

The nonvolatile memory 130 is made of a flash memory or the like, and stores various programs and data in the state capable of being rewritten.

The RAM 140 is used as a temporary storage region of the program read from the ROM 120, input or output data, a parameter, and the like, in each processing executed by the CPU 110.

The image processing section 151 performs the image processing (such as variable power, filtering, and γ conversion) of the image data transmitted from the image reading section 10, the external I/F 400, and the like, and generates image data for printing which is to be an object of print output.

The LPH control section 152 stores the image data for printing generated by the image processing section 151, and outputs various signals based on the generated image data for printing to the LPHs 33Y, 33M, 33C, and 33K.

The I/O 160 is connected to the RFID transmitting and receiving sections 620Y, 620M, 620C, and 620K provided at the positions corresponding to the LPHs 33Y, 33M, 33C, and 33K, respectively. The I/O 160 outputs the data read from the respective RFID transmitting and receiving sections 620Y, 620M, 620C, and 620K to the CPU 110, and makes the nonvolatile memory 130 store the data.

The mechanism control section 200 collectively controls various drive mechanisms and various sensors in the image forming apparatus 1 on the basis of the signals from the main body control section 100, and, for example, controls the drive of the motor to rotate the photosensitive body drum 31Y at a constant speed.

The operation display section 300 is composed of a display screen using a liquid crystal display (LCD), an organic electronic luminescent (EL) element, or the like, an operation key group including a power switch, an operation display control section, and the like. On the display screen, a touch panel is provided to cover the display screen, and the operation display control section makes the display screen display various setting screens for inputting various setting conditions, the operation state, processing results, and the like, of the image forming apparatus 1 in accordance with display signals input from the main body control section 100. Moreover, the operation display control section transmits the operation signals input from the operation key group or the touch panel to the main body control section 100.

The external I/F 400 is composed of various interfaces such as a network interface card (NIC), a modulator-demodulator (MODEM), and a universal serial bus (USB), and mutually performs the transmission and the reception of information with external equipment connected to the external I/F 400 in the state capable of performing communication.

The RFID tags 610$Y_1$-610$Y_m$ are each provided by being stuck to the LPH 33Y. Each of the RFID tags 610$Y_1$-610$Y_m$ includes an IC chip as a light quantity correcting data storage section and an antenna coil as a communication section. The IC chip stores correction data (hereinafter referred to as light quantity correcting data) to adjust the light quantities of the LED elements in an assigned group among the LED elements provided in the LPH 33Y and a discrimination code to discriminate the RFID tag. The antenna coil performs the transmission and the reception of the light quantity correcting data with the RFID transmitting and receiving section 620Y by wireless communication. Each of the RFID tags 610$Y_1$-610$Y_m$ is a battery-less type RFID tag, which performs the transmission and the reception of the light quantity correcting data and the discrimination code, which are stored in the IC chip, against the RFID transmitting and receiving section 620Y by the power supplied by an induced electromagnetic field generated by the wireless frequency transmitted by the RFID transmitting and receiving section 620Y.

The RFID tags 610$M_1$-610$M_m$, 610$C_1$-610$C_m$, and 610$K_1$-610$K_m$ are provided by being stuck to the LPHs 33M, 33C, and 33K, respectively, in a similar way to the RFID tags 610$Y_1$-610$Y_m$. Each of the RFID tags 610$M_1$-610$M_m$, 610$C_1$-610$C_m$, and 610$K_1$-610$K_m$ includes an IC chip to store the light quantity correcting data of the LED elements in an assigned group among the LED elements provided in the LPHs 33M, 33C, and 33K, respectively, and an antenna coil to perform the transmission and the reception of the light quantity correcting data with the RFID transmitting and receiving sections 620M, 620C, and 620K, respectively, by wireless communication. Each of the RFID tags 610$M_1$-610$M_m$, 610$C_1$-610$C_m$, and 610$K_1$-610$K_m$ is a battery-less type RFID tag to perform the transmission and the reception of the light quantity correcting data stored in the IC chip against the RFID transmitting and receiving sections 620M, 620C, and 620K, respectively, by the electric power supplied by the induced electromagnetic field generated by the wireless frequency signals transmitted from the RFID transmitting and receiving sections 620*m*, 620C, and 620K, respectively.

The RFID transmitting and receiving section 620Y is connected to the CPU 110 through the I/O 160, and is equipped with an antenna coil capable of generating a wireless frequency signal to perform wireless communication with the RFID tags 610Y1-610Ym in accordance with the instructions from the CPU 110. The RFID transmitting and receiving section 620Y realizes the function as an RFID transmitting and receiving section to generate an induced electromagnetic field in each of the RFID tags 610$Y_1$-610$Y_m$ with the antenna coil and to perform the transmission and the reception of the light quantity correcting data stored in the RFID tags 610$Y_1$-610$Y_m$, respectively.

The RFID transmitting and receiving sections 620M, 620C, and 620K are connected to the CPU 110 through the I/O 160 similarly to the RFID transmitting and receiving section 620Y, and are equipped with antenna coils to perform the wireless communication with the RFID tags 610$M_1$-610$M_m$, 610$C_1$-610$C_m$, and 610$K_1$-610$K_m$, respectively, in accordance with the instructions from the CPU 110. The RFID transmitting and receiving sections 620M, 620C, and 620K generate induced electromagnetic fields to the RFID tags 610$M_1$-610$M_m$, 610$C_1$-610$C_m$, and 610$K_1$-610$K_m$, respectively, by the antenna coils, and perform the transmission and the reception of the light quantity correcting data stored in the RFID tags 610$M_1$-610$M_m$, 610$C_1$-610$C_m$, and 610$K_1$-610$K_m$, respectively.

Incidentally, an example of using the electromagnetic induction type RFID tags 610Y1-610Ym, 610$M_1$-610$M_m$, 610$C_1$-610$C_m$, and 610$K_1$-610$K_m$ and RFID transmitting and receiving sections 620Y, 620M, 620C, and 620K is cited to be described in the present embodiment, but electric wave type ones may be applied.

The wireless frequencies capable of being used for the electromagnetic induction type or electric wave type RFID tags 610Y1-610Ym, 610$M_1$-610$M_m$, 610$C_1$-610$C_m$, and 610$K_1$-610$K_m$ and RFID transmitting and receiving sections 620Y, 620M, 620C, and 620K are set according to the ambient environment in consideration of the fact that there are legal limitations of the usable wireless frequencies in some places (areas, countries, and the like) where the image forming apparatus 1 is used, and the fact that the characteristics such as the maximum communication distances, directivity, communication speeds, noises, and electric wave hindrances are different according to a frequency band.

Next, the operation of the present embodiment is described.

Figure 4:
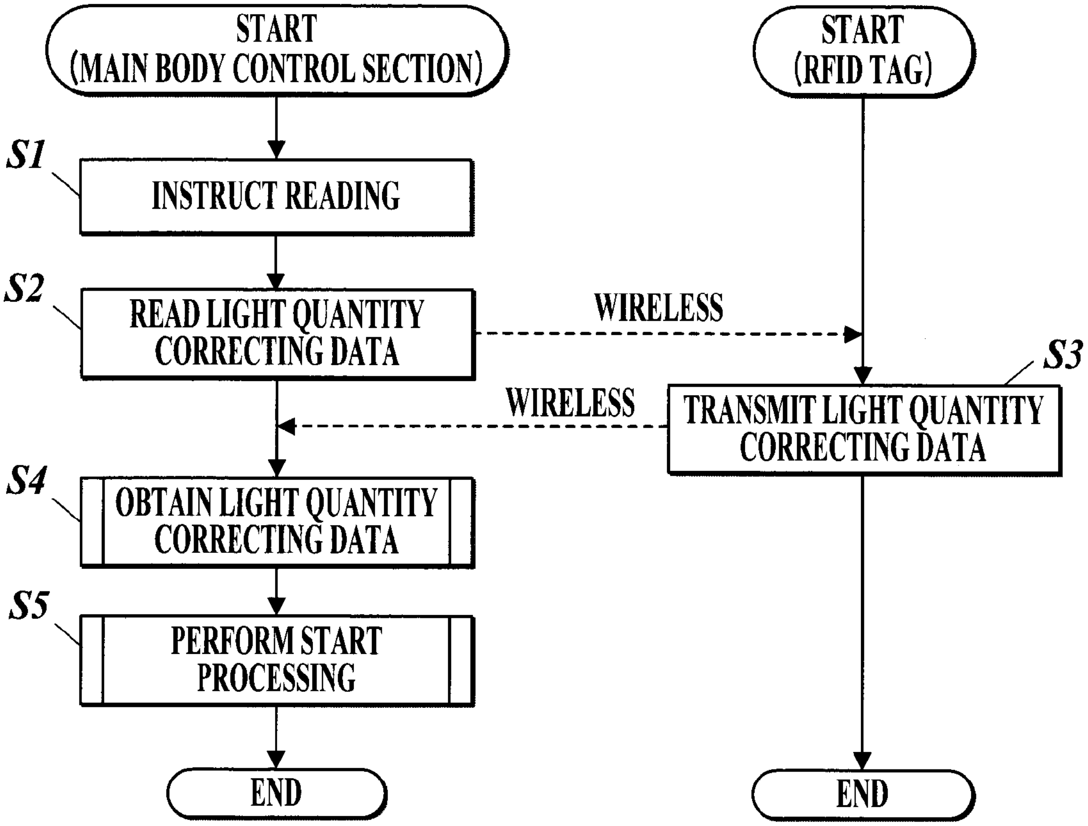
FIG. 4 is a diagram showing the flowchart of light quantity correcting data reading processing to an LPH 33Y.

The processing shown in FIG. 4 is an operation realized by the cooperation with the CPU 110, the ROM 120, and the nonvolatile memory 130 or the RAM 140 in the main body control section 100, and the flowchart of the light quantity correcting data reading processing to the LPH 33Y is shown.

When the supply of electric power to the image forming apparatus 1 is started by an operation of an electric power switch provided in the operation display section 300 of the image forming apparatus 1, or when a reading instruction of light quantity correcting data is input together with an instruction to perform image formation (Step S1), the RFID transmitting and receiving section 620Y is driven. A wireless frequency signal is transmitted to the selected RFID tag among the RFID tags 610$Y_1$-610$Y_m$ provided to the LPH 33Y on the basis of the discrimination code of the selected RFID tag, and the reading of the light quantity correcting data is started (Step S2).

It is supposed that the selected RFID tag means, for example, all the RFID tags 610$Y_1$-610$Y_m$ provided to the LPH 33Y when the supply of electric power to the image forming apparatus 1 is started, and the RFID tag assigned to the group at the positions corresponding to the main scanning width of a sheet of paper to be subjected to the image formation, that is, the RFID tag having the light quantity correcting data of the LED elements at the positions corresponding to the main scanning width of the paper on which image formation is performed when a reading instruction of light quantity correcting data is input.

The selected RFID tag transmits the light quantity correcting data and discrimination code stored in the IC chip to the RFID transmitting and receiving section 620Y by the supply of electric power supplied from the induced electromagnetic field generated by the wireless frequency signal transmitted from the RFID transmitting and receiving section 620Y (Step S3).

When the light quantity correcting data and the discrimination code transmitted from the selected RFID tag is received by the RFID transmitting and receiving section 620Y, the obtainment processing of the light quantity correcting data is executed (Step S4).

The obtainment processing of the light quantity correcting data at Step S4 first specifies the RFID tag corresponding to the discrimination code on the basis of the received discrimination code. Next, the group assigned to the specified RFID tag is specified, and the LED elements corresponding to the light quantity correcting data received together with the discrimination code are specified. Then, the light quantity correcting data is stored in the nonvolatile memory 130 as the light quantity correcting data corresponding to the specified LED elements of the LPH 33Y.

After the processing at Step S4, the start processing of the processing pertaining to the image data in the image forming apparatus 1 is started (Step S5), and the present processing is ended.

Because the flowcharts of the light quantity correcting data reading processing of the LPHs 33M, 33C, and 33K are related to the processing using the selective access method similar to the processing of the LPH 33Y shown in FIG. 4, the illustration of the flowcharts and their descriptions are omitted. Incidentally, the light quantity correcting data reading processing of the LPHs 33Y, 33M, 33C, and 33K may be executed in parallel or may be executed sequentially.

Next, the writing processing of the light quantity correcting data is described.

As to the writing processing of light quantity correcting data, the RFID transmitting and receiving section 620Y is driven when an instruction of stopping the supply of electric power or an instruction of writing the light quantity correcting data is input to the image forming apparatus 1 by an operation of an electric power switch provided in the operation display section 300 of the image forming apparatus 1. A wireless frequency signal is then transmitted to the selected RFID tag among the RFID tags 610$Y_1$-610$Y_m$ provided to the LPH 33Y on the basis of the discrimination code of the selected RFID tag, and the writing of the light quantity correcting data is started.

The selected RFID tag means, for example, all the RFID tags 610$Y_1$-610$Y_m$ provided to the LPH 33Y when the instruction of stopping the supply of electric power is input into the image forming apparatus 1, and the RFID tag instructed from the operation display section 300 or the external I/F 400 when a writing instruction of light quantity correcting data is input.

The selected RFID tag updates the light quantity correcting data stored in the IC chip by rewriting the light quantity correcting data to the received light quantity correcting data by the supply of electric power supplied from the induced electromagnetic field generated by the wireless frequency signal transmitted from the RFID transmitting and receiving section 620Y, and transmits a signal indicating the completion of writing (writing completion signal) to the RFID transmitting and receiving section 620Y.

When the RFID transmitting and receiving section 620Y receives the writing completion signal from the selected RFID tag, the present processing is ended.

Because the light quantity correcting data writing processing to the LPHs 33M, 33C, and 33K is the processing using the selective access method similar to that to the LPH 33Y, the description thereof is omitted. Incidentally, the light quantity correcting data writing processing to the LPHs 33Y, 33M, 33C, and 33K may be executed in parallel to one another or may be sequentially executed.

Because the light quantity correcting data of each LPH is stored by a plurality of RFID tags, it is sufficient to perform communication with the RFID tag storing the light quantity correcting data necessary at the time of performing a reading or writing operation of the light quantity correcting data, and the reduction of the communication load can be attained. Consequently, a smooth reading or writing operation of the light quantity correcting data can be realized without being subjected to the limitation of the interface circuit, and the speeding up of the communication of the light quantity correcting data can be attained.

Furthermore, because the communication is performed only with the RFID tag storing the light quantity correcting data of the LED elements needed to be read or written, and especially because only the light quantity correcting data of the LED elements at the positions corresponding to the main scanning width of a sheet of paper on which an image is formed can be read, the reduction of the communication load can be attained, and the speeding up of the reading or the writing of light quantity correcting data can be attained.

Moreover, the present invention is not limited to the content of the embodiment described above, but the content of the embodiment can suitably be changed within a range of not departing from the spirit and the scope of the present invention.

According to an aspect of the preferred embodiments of the present invention, there is provided an optical writing device comprising:

a plurality of light emitting diode elements which are arranged in a main scanning direction; and a plurality of radio frequency identification tags which are provided correspondingly to one or more light emitting diode elements among the plurality of light emitting diode elements, each of the plurality of radio frequency identification tags having a light quantity correcting data storage section to store light quantity correcting data for adjusting a light quantity of the one or more light emitting diode elements, and a communication section to perform a wireless communication.

According to the optical writing device, because a plurality of RFID tags stores light quantity correcting data, it is sufficient to perform communication with the RFID tag that stores the light quantity correcting data necessary at the time of performing the operation of reading or the writing of the light quantity correcting data, and can attain the reduction of a communication load. Consequently, the speeding up of the communication of the light quantity correcting data can be attained, attaining the facilitation of the reading or writing operation of the light quantity correcting data.

According to another aspect of the preferred embodiments of the present invention, there is provided an image forming apparatus comprising:

an optical writing device having:

a plurality of light emitting diode elements which are arranged in a main scanning direction; and a plurality of radio frequency identification tags which are provided correspondingly to one or more light emitting diode elements among the plurality of light emitting diode elements, each of the plurality of radio frequency identification tags having a light quantity correcting data storage section to store light quantity correcting data for adjusting a light quantity of the one or more light emitting diode elements, and a communication section to a perform wireless communication;

a radio frequency identification transmitting and receiving section to perform the wireless communication with the radio frequency identification tags;

a control section to make the radio frequency identification transmitting and receiving section perform the wireless communication with the radio frequency identification tags so as to read or write the light quantity correcting data from each of the light quantity correcting data storage sections in each of the radio frequency identification tags; and a storage section to store the light quantity correcting data which is read from each of the light quantity correcting data storage sections in each of the radio frequency identification tags by the control section.

According to still another aspect of the preferred embodiments of the present invention, there is provided an optical writing light quantity correcting method used in an image forming apparatus which forms an image by an optical writing device having a plurality of light emitting diode elements arranged in a main scanning direction, comprising:

dividing an arrangement of the light emitting diode elements into groups including two or more light emitting diode elements, and storing light quantity correcting data in advance to adjust a light quantity of the two or more light emitting diode elements included in each of the groups, in a plurality of radio frequency identification tags which are provided correspondingly to each of the groups;

reading the light quantity correcting data of the two or more light emitting diode elements included in each of the groups by performing a wireless communication with the plurality of radio frequency identification tags;

storing the read light quantity correcting data in a storage section; and adjusting the light quantity of the two or more light emitting diode elements included in each of the groups based on the stored light quantity correcting data.

According to the image forming apparatus and the light quantity correcting method, because it is possible to read or write the light quantity correcting data of the optical writing device from the plurality of RFID tag provided in the optical writing device, the smooth reading and the writing of the light quantity correcting data can be realized without being subjected to the limitation of an interface circuit, and the speeding up of the communication of the light quantity correcting data can be attained.

Preferably, the plurality of light emitting diode elements are divided into a plurality of groups along the main scanning direction for every one or more light emitting diode elements, the radio frequency identification tags are provided in a state of being assigned so as to correspond to one group or two or more adjoining groups, and the light quantity correcting data storage section of the assigned radio frequency identification tags stores the light quantity correcting data of the light emitting diode elements of the one group or the two or more adjoining groups.

Further, the light quantity correcting data of the plurality of LED elements belonging to one or an adjoining plurality of groups to an RFID tag can be stored.

Preferably, the groups are configured by dividing the plurality of light emitting diode elements into every previously set number of the light emitting diode elements along the main scanning direction.

Further, the light quantity correcting data can be managed for every group divided for every previously set number of LED elements, for example, for every LED chip.

Preferably, the groups are configured by dividing the plurality of light emitting diode elements based on a main scanning width of a plurality types of sheets on which an image is to be formed by an optical writing.

Further, the light quantity correcting data can be managed for every group divided on the basis of the main scanning width of a sheet of paper.

Preferably, a discrimination code is stored in the light quantity correcting data storage section of the radio frequency identification tags, together with the light quantity correcting data.

Preferably, the control section reads the light quantity correcting data from the radio frequency identification tags having the light quantity correcting data of the light emitting diode elements at a position corresponding to a main scanning width of a sheet on which an image is to be formed, among the plurality of radio frequency identification tags based on the main scanning width of the sheet on which the image is to be formed.

Further, because it is possible to read only the light quantity correcting data of the LED elements at the positions corresponding to the main scanning width of a sheet of paper on which an image is formed, the reduction of a communication load can be attained, and the speeding up of the reading of the light quantity correcting data can be attained.

The present U.S. patent application claims a priority under the Paris Convention of Japanese patent application No. 2007-177348 filed on Jul. 5, 2007, which shall be a basis of correction of an incorrect translation.

What is claimed is:

1. An image forming apparatus comprising:

an optical writing device having:

a plurality of light emitting diode elements which are arranged in a main scanning direction; and a plurality of radio frequency identification tags which are provided correspondingly to one or more light emitting diode elements among the plurality of light emitting diode elements, each of the plurality of radio frequency identification tags having a light quantity correcting data storage section to store light quantity correcting data for adjusting a light quantity of the one or more light emitting diode elements, and a communication section to a perform wireless communication;

a radio frequency identification transmitting and receiving section to perform the wireless communication with the radio frequency identification tags;

a control section to make the radio frequency identification transmitting and receiving section perform the wireless communication with the radio frequency identification tags so as to read or write the light quantity correcting data from each of the light quantity correcting data storage sections in each of the radio frequency identification tags; and a storage section to store the light quantity correcting data which is read from each of the light quantity correcting data storage sections in each of the radio frequency identification tags by the control section.

2. The image forming apparatus of claim 1, wherein the control section reads the light quantity correcting data from the radio frequency identification tags having the light quantity correcting data of the light emitting diode elements at a position corresponding to a main scanning width of a sheet on which an image is to be formed, among the plurality of radio frequency identification tags based on the main scanning width of the sheet on which the image is to be formed.

3. The image forming apparatus of claim 1, wherein the plurality of light emitting diode elements are divided into a plurality of groups along the main scanning direction for every one or more light emitting diode elements, the radio frequency identification tags are provided in a state of being assigned so as to correspond to one group or two or more adjoining groups, and the light quantity correcting data storage section of the assigned radio frequency identification tags stores the light quantity correcting data of the light emitting diode elements of the one group or the two or more adjoining groups.

4. The image forming apparatus of claim 1, wherein the groups are configured by dividing the plurality of light emitting diode elements into every previously set number of the light emitting diode elements along the main scanning direction.

5. The image forming apparatus of claim 1, wherein the groups are configured by dividing the plurality of light emitting diode elements based on a main scanning width of a plurality types of sheets on which an image is to be formed by an optical writing.

6. The image forming apparatus of claim 1, wherein a discrimination code is stored in the light quantity correcting data storage section of the radio frequency identification tags, together with the light quantity correcting data.

7. An optical writing light quantity correcting method used in an image forming apparatus which forms an image by an optical writing device having a plurality of light emitting diode elements arranged in a main scanning direction, comprising:

dividing an arrangement of the light emitting diode elements into groups including two or more light emitting diode elements, and storing light quantity correcting data in advance to adjust a light quantity of the two or more light emitting diode elements included in each of the groups, in a plurality of radio frequency identification tags which are provided correspondingly to each of the groups;

reading the light quantity correcting data of the two or more light emitting diode elements included in each of the groups by performing a wireless communication with the plurality of radio frequency identification tags;

storing the read light quantity correcting data in a storage section; and adjusting the light quantity of the two or more light emitting diode elements included in each of the groups based on the stored light quantity correcting data.

8. The optical writing light quantity correcting method of claim 7, wherein the groups are configured by dividing the plurality of light emitting diode elements into every previously set number of the light emitting diode elements along the main scanning direction.

9. The optical writing light quantity correcting method of claim 7, wherein the groups are configured by dividing the plurality of light emitting diode elements based on a main scanning width of a plurality types of sheets on which an image is to be formed by an optical writing.

10. The optical writing light quantity correcting method of claim 7, wherein a discrimination code is stored in the light quantity correcting data storage section of the radio frequency identification tags, together with the light quantity correcting data.

* * * * *